(12) United States Patent (10) Patent No.: US 12,595,859 B2
Zhu et al. (45) Date of Patent: Apr. 7, 2026

(54) BALANCE VALVE, BATTERY AND POWER CONSUMPTION APPARATUS

(71) Applicant: CONTEMPORARY AMPEREX TECHNOLOGY (HONG KONG) LIMITED, Hong Kong (CN)

(72) Inventors: Decai Zhu, Ningde City (CN); Ziqiang Wu, Ningde City (CN); Langchao Hu, Ningde City (CN); Binbin Chen, Ningde City (CN); Peng Wang, Ningde City (CN); Jinqing Ji, Ningde City (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 40 days.

(21) Appl. No.: 18/910,736

(22) Filed: Oct. 9, 2024

(65) Prior Publication Data

US 2025/0035223 A1 Jan. 30, 2025

Related U.S. Application Data

(63) Continuation of application No. 17/530,808, filed on Nov. 19, 2021, now Pat. No. 12,158,216, which is a
(Continued)

(30) Foreign Application Priority Data

Aug. 31, 2020 (CN) .......................... 202010901521.X

(51) Int. Cl.
*F16K 17/18* (2006.01)
*H01M 50/325* (2021.01)

(52) U.S. Cl.
CPC ........... *F16K 17/18* (2013.01); *H01M 50/325* (2021.01)

(58) Field of Classification Search
CPC ... H01M 50/325; H01M 50/317; F16K 17/18; F16K 17/19; F16K 15/16
See application file for complete search history.

(56) References Cited

U.S. PATENT DOCUMENTS 3,941,149 A 3/1976 Mittleman
4,440,308 A 4/1984 Baker
(Continued)

FOREIGN PATENT DOCUMENTS

BE 1009834 A6 10/1997
CN 101956851 A 1/2011
(Continued)

OTHER PUBLICATIONS

Machine English translation of DE-102013213909-A1 (Year: 2026).*
(Continued)

*Primary Examiner* — Hailey K. Do
(74) *Attorney, Agent, or Firm* — Scully, Scott, Murphy & Presser, P.C.

(57) ABSTRACT

A balance valve, a battery, and a power consumption apparatus are provided in the embodiments of the present application. The balance valve includes a body, a breathable membrane and a gas barrier structure, where the body is provided with a ventilation channel; the breathable membrane is arranged at one end of the ventilation channel; and, the gas barrier structure is arranged at the other end of the ventilation channel, and the gas barrier structure is configured to open the ventilation channel when the gas pressures inside and outside the gas barrier structure are unbalanced, so as to achieve the gas pressure balance between the inside and outside of the gas barrier structure. The balance valve is applicable to a battery, which could achieve a balance of gas
(Continued)

pressures inside and outside the battery when there is a pressure difference between the inside and outside of the battery.

17 Claims, 10 Drawing Sheets

Related U.S. Application Data continuation of application No. PCT/CN2021/092835, filed on May 10, 2021.

(56) References Cited

U.S. PATENT DOCUMENTS

| | | | | |
|---|---|---|---|---|
| 5,320,253 | A | * | 6/1994 | Robinson ............ A01M 7/0085 |
| | | | | 222/481.5 |
| 5,860,708 | A | * | 1/1999 | Borders ................... B60B 7/00 |
| | | | | 301/108.4 |
| 9,976,661 | B2 | | 5/2018 | Zhang |
| 10,529,969 | B2 | * | 1/2020 | Ogawa ................ F16K 17/0493 |
| 10,539,246 | B2 | | 1/2020 | Pflueger et al. |
| 11,191,943 | B1 | | 12/2021 | Asada et al. |
| 11,306,839 | B1 | | 4/2022 | Anderson |
| 2005/0257837 | A1 | | 11/2005 | Bailey |
| 2019/0017614 | A1 | | 1/2019 | Li et al. |
| 2019/0099595 | A1 | | 4/2019 | Kunschak |

FOREIGN PATENT DOCUMENTS

| | | | | | | |
|---|---|---|---|---|---|---|
| CN | 205860642 | U | | 1/2017 | | |
| CN | 109253290 | A | | 1/2019 | | |
| CN | 104455616 | B | | 2/2019 | | |
| CN | 209357809 | U | | 9/2019 | | |
| CN | 210153290 | U | | 3/2020 | | |
| CN | 110953356 | A | | 4/2020 | | |
| CN | 210751987 | U | | 6/2020 | | |
| CN | 111490212 | A | | 8/2020 | | |
| CN | 111779866 | A | | 10/2020 | | |
| DE | 19901798 | A1 | | 7/2000 | | |
| DE | 102004046844 | A1 | | 10/2005 | | |
| DE | 102012202103 | A1 | | 8/2013 | | |
| DE | 102013213909 | A1 | * | 1/2015 | .......... | H01M 50/317 |
| DE | 202015003500 | U1 | | 6/2015 | | |
| DE | 102015214256 | A1 | | 2/2017 | | |
| JP | 2006294290 | A | | 10/2006 | | |
| JP | 2019087402 | A | | 6/2019 | | |
| KR | 20190049160 | A | | 5/2019 | | |
| KR | 20190127934 | A | | 11/2019 | | |
| WO | WO-03040575 | A1 | * | 5/2003 | ............ | F16K 17/19 |
| WO | 2020063043 | A1 | | 4/2020 | | |

OTHER PUBLICATIONS

Request for the Submission of an Opinion dated Dec. 14, 2023 received in Korean Patent Application No. KR 10-2021-7043324.
International Search Report and Written Opinion dated Aug. 17, 2021 received in International Application No. PCT/CN2021/092835.
Notification of Registration and Grant of Patent for Invention dated Sep. 21, 2023 received in Chinese Patent Application No. CN 202010901521.
Office Action dated Jan. 9, 2023 received in European Patent Application No. EP 21827529.5.
Notice of Reasons for Refusal dated Jan. 30, 2023 received in Japanese Patent Application No. JP 2022-500103.
Extended European Search Report dated Aug. 18, 2022 received in European Patent Application No. EP 21827529.5.
First Office Action dated Jul. 5, 2022 received in Chinese Patent Application No. Cn 202010901521.X.
Office Action dated May 9, 2024 received in United States U.S. Appl. No. 17/530,808.
Notice of Allowance dated Aug. 28, 2024 received in United States U.S. Appl. No. 17/530,808.
Notice of Allowance dated Feb. 10, 2026 received in U.S. Appl. No. 18/910,759.

* cited by examiner

900

800

100

100

BALANCE VALVE, BATTERY AND POWER CONSUMPTION APPARATUS

CROSS-REFERENCE TO RELATED APPLICATIONS

This application is a continuation of U.S. patent application Ser. No. 17/530,808, filed on Nov. 19, 2021, which is a continuation of International Application No. PCT/CN2021/092835, filed on May 10, 2021. The International Application claims priority to Chinese Patent Application No. 202010901521.X, filed on Aug. 31, 2020. All of the aforementioned patent applications are hereby incorporated by reference in their entireties.

FIELD OF TECHNOLOGY

This application relates to the technical field of balance valves, and in particular to a balance valve, a battery and a power consumption apparatus.

BACKGROUND

In the field of power batteries, due to the battery's own heating, cooling, and changes in the external environment temperature, there is a pressure difference between the inside and outside of the battery, which produces a breathing effect and affects the battery's sealing performance.

SUMMARY

The purpose of the present application is to provide a balance valve applicable to a battery, which could achieve a balance of gas pressures inside and outside the battery when there is a pressure difference between the inside and outside of the battery.

Another object of the present application is to provide a battery with an extended service life.

Another object of the present application is to provide a power consumption apparatus with a longer service life.

This application is realized through the following technical solutions:

On the one hand, an embodiment of the present application provides a balance valve, including:

a body, the body being provided with a ventilation channel;

a breathable membrane, the breathable membrane being arranged at one end of the ventilation channel, and the breathable membrane being configured to maintain the gas circulation of the ventilation channel; and a gas barrier structure, the gas barrier structure being arranged at the other end of the ventilation channel, and the gas barrier structure being configured to close the ventilation channel when the gas pressures inside and outside the gas barrier structure are balanced, while the gas barrier structure being configured to open the ventilation channel when the gas pressures inside and outside the gas barrier structure are unbalanced, so as to achieve a balance of the gas pressure inside and outside the gas barrier structure.

According to the balance valve provided in the embodiment of the present application, the gas barrier structure is provided, so that only when the gas pressures on both sides of the gas barrier structure are unbalanced, the gas barrier structure opens the ventilation channel to realize the gas circulation of the ventilation channel. When the gas pressures are balanced, the ventilation channel is closed, so that the ventilation channel can prevent water vapor from continuously entering an enclosed cavity through the breathable membrane, which effectively reduces the water vapor entering the enclosed cavity, thereby reducing the accumulation of condensed water in the cavity.

In one solution of the present application, the gas barrier structure includes a first barrier member and a second barrier member; when the gas pressure inside the gas barrier structure is greater than the gas pressure outside, the first barrier member is configured to be able to open unidirectionally towards the outside; when the gas pressure outside the gas barrier structure is greater than the gas pressure inside, the second barrier member is configured to be able to open unidirectionally towards the inside; when the gas pressure outside the gas barrier structure is balanced with the gas pressure inside, the first barrier member and the second barrier member are configured to close the ventilation channel together.

In the above implementation, according to the difference between the gas pressures inside and outside the gas barrier structure, the first barrier member and the second barrier member act separately to realize the opening or closing of the ventilation channel, thereby ensuring the gas pressure balance between the inside and outside of the gas barrier structure.

In one solution of the present application, the gas barrier structure further includes a base, and the base is provided with a first through hole and a second through hole, the first through hole and the second through hole are both in communication with the ventilation channel; when the gas pressure inside the gas barrier structure is greater than the gas pressure outside, the first barrier member is configured to open the first through hole; when the gas pressure outside the gas barrier structure is greater than the gas pressure inside, the second barrier member is configured to open the second through hole; when the gas pressure outside the gas barrier structure is balanced with the gas pressure inside, the first barrier member closes the first through hole, and the second barrier member closes the second through hole.

In the above implementation, the first barrier member is matched with the first through hole, and the second barrier member is matched with the second through hole, and the corresponding through hole can be opened or closed according to the gas pressure difference between inside of and outside of the gas barrier structure, thereby the gas pressures are balanced on both sides of the gas barrier structure.

In one solution of the present application, the first barrier member and the second barrier member are respectively arranged at opposite sides of the base, the first barrier member is configured to block the first through hole and expose the second through hole, and the second barrier member is configured to block the second through hole and expose the first through hole.

In the above implementation, the first barrier member and the second barrier member are respectively arranged on opposite sides of the base, where the first barrier member can block the first through hole and expose the second through hole, and the second barrier member can be block the second through hole and expose the first through hole. When the gas pressure inside the gas barrier structure is greater than the gas pressure outside, the first barrier member can open the first through hole, and the second barrier member can block the second through hole so that gas can flow from the inside of the gas barrier structure towards the outside until the gas pressures inside and outside the gas barrier structure are balanced. On the contrary, when the gas pressure outside the gas barrier structure is greater than the gas pressure inside, the second barrier member can open the second through hole, and the first barrier member can block the first through hole, so that the gas flows from the outside of the gas barrier structure towards the inside, until the gas pressures inside and outside the gas barrier structure are balanced. When the gas pressure outside the gas barrier structure is balanced with the gas pressure inside, the first barrier member blocks the first through hole, and the second barrier member blocks the second through hole.

In one solution of the present application, both the first barrier member and the second barrier member are valve structures.

In the above implementation, the first barrier member and the second barrier member having the valve structures are easily opened following the change of the gas pressure, which facilitates the balance of the gas pressures inside and outside the gas barrier structure.

In one solution of the present application, the thickness of the second barrier member is greater than the thickness of the first barrier member.

In the above implementation, since the second barrier member is configured to open the second through hole when the gas pressure outside the gas barrier structure is greater than the gas pressure inside, when the thickness of the second barrier member is greater than the thickness of the first barrier member, the second barrier member is more difficult to be opened in comparison with the first barrier member, that is, it increases the difficulty for the gas outside to enter the inside of the gas barrier structure, and prevents the water vapor from easily entering the inside of the gas barrier structure so as to reduce the accumulation of condensed water inside the gas barrier structure.

In one solution of the present application, the first barrier member includes a first fixing portion and a first opening-closing portion that are connected, the second barrier member includes a second fixing portion and a second opening-closing portion that are connected, where the first fixing portion and the second fixing portion are both fixed to the base; when the gas pressure outside the gas barrier structure is balanced with the gas pressure inside, the first opening-closing portion and the second opening-closing portion are both attached to the base, where the first opening-closing portion blocks the first through hole, while the second opening-closing portion blocks the second through hole; when the gas pressure inside the gas barrier structure is greater than the gas pressure outside, the first opening-closing portion is detached from the base to open the first through hole; when the gas pressure outside the gas barrier structure is greater than the gas pressure inside, the second opening-closing portion is detached from the base to open the second through hole.

In the above implementation, the first fixing portion and the second fixing portion are both fixed to the base. According to the gas pressure difference between the inside and outside of the gas barrier structure, the first opening-closing portion and the second opening-closing portion are attached to or detached from the base accordingly, so as to realize the opening or closing of the corresponding through hole, and further realize the balance of the gas pressures inside and outside the gas barrier structure.

In one solution of the present application, the first fixing portion is fixed to the base through at least two fixing points, and/or the second fixing portion is fixed to the base through at least two fixing points.

In the above implementation, the first fixing portion and the second fixing portion are respectively fixed to the base through at least two fixing points to ensure that the first barrier member and the second barrier member will not rotate relative to the base when the corresponding through hole is opened.

In one solution of the present application, the gas barrier structure further includes two rivets, both of the two rivets being configured to pass through the first fixing portion, the base, and the second fixing portion so as to realize the fixation of the first barrier member, the second barrier member and the base.

In the above implementation, the first fixing portion, the base and the second fixing portion are fixed by two rivets, which makes the gas barrier structure more compact as a whole and saves installation space.

In one solution of the present application, the cross-sectional area of the first through hole is larger than the cross-sectional area of the second through hole.

In the above implementation, the cross-sectional area of the first through hole is greater than the cross-sectional area of the second through hole, so that the gas inside the gas barrier structure can more easily flow to the outside of the gas barrier structure.

In one solution of the present application, the base is fixed connection to the ventilation channel.

In the above implementation, the base is fixed to the ventilation channel to prevent the gas barrier structure from moving relative to the ventilation channel according to the gas pressure difference between the inside and outside, which facilitates the gas pressure balance between the inside and outside of the gas barrier structure.

In one solution of the present application, the body includes a valve body and a valve core, the valve core is configured to be movably installed on the valve body, the ventilation channel is provided with the valve core, and the breathable membrane and the gas barrier structure are both fixed to the valve core.

In the above implementation, the valve core is configured to be movably installed on the valve body, the ventilation channel is provided on the valve core, and both of the breathable membrane and the gas barrier structure are fixed to the valve core, so as to realize the installation and positioning of the breathable membrane and the gas barrier structure.

In one solution of the present application, the valve body is provided with a guide hole and a gas vent, the valve core includes a piston and a guide post, one end of the guide post is connected to the piston, and the other end of the guide post is configured to movably pass through the guide hole, the piston is configured to abut against the valve body, the piston covers the gas vent, and the ventilation channel penetrates the guide post and the piston.

In the above implementation, the ventilation channel penetrates the guide post and the piston to facilitate the installation of the breathable membrane and the gas barrier structure.

In one solution of the present application, the body includes a valve body and a valve core, the valve core is configured to be movably installed on the valve body, the ventilation channel includes a first section and a second section communicating with each other, where the first section is provided on the valve body and the second section is provided on the valve core, the breathable membrane is fixed to the valve core or valve body, and the gas barrier structure is fixed to the valve core or valve body.

In the above implementation, the breathable membrane and the gas barrier structure include different installation positions, as long as the breathable membrane and the gas barrier structure are located at both ends of the ventilation channel.

In one solution of the present application, the ventilation channel includes opposite outer end and inner end, the breathable membrane is arranged at the outer end of the ventilation channel, and the gas barrier structure is arranged at the inner end of the ventilation channel.

In the above implementation, the breathable membrane is arranged at the outer end of the ventilation channel, and the gas barrier structure is arranged at the inner end of the ventilation channel, so that external dust and moisture can be blocked from the outer end of the ventilation channel.

In another aspect, an embodiment of the present application provides a battery, including a box, a battery cell, and the balance valve as described above, where the battery cell is arranged in the box, and the balance valve is arranged on the box.

In another aspect, an embodiment of the present application provides a power consumption apparatus, including the battery as described above.

The additional aspects and advantages of the present application will be partially given in the following description, and part thereof will become obvious from the following description, or be understood through the practice of the present application.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show merely some embodiments of this application, and a person of ordinary skill in the art may derive other drawings from these accompanying drawings without creative efforts.

Figure 1:
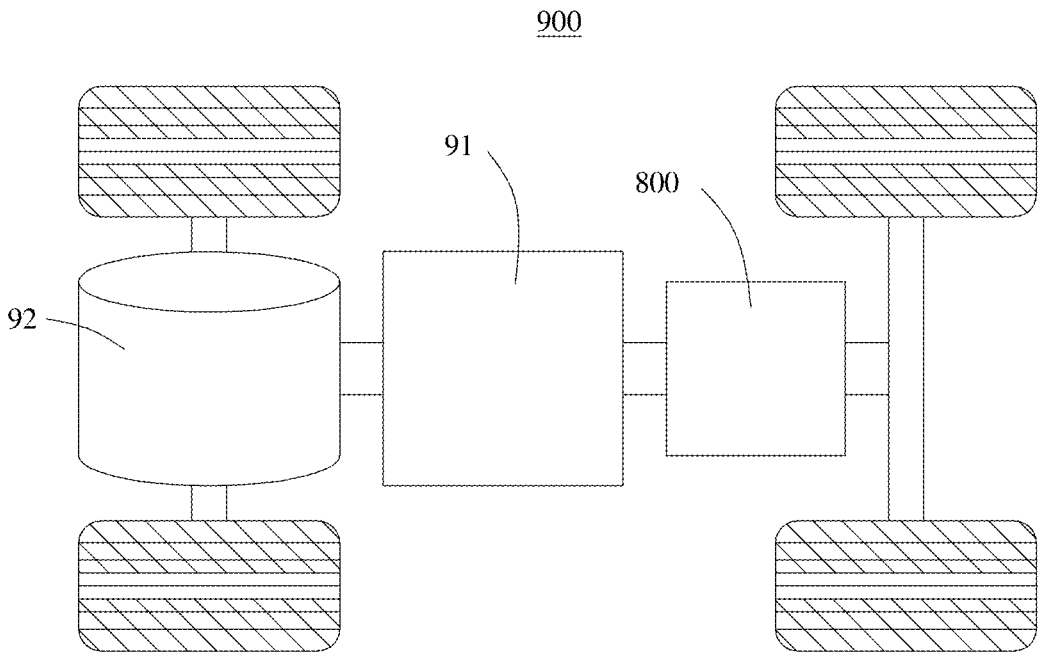
FIG. 1 is a schematic structural diagram of an embodiment of a vehicle provided in this application.

Reference numbers: 100—balance valve; 10—body; 11—ventilation channel; 111—first section; 112—second section; 12*a*, 12*b*—valve body; 121—guide hole; 122—gas vent; 13*a*, 13*b*—valve core; 131—piston; 132—guide post; 14*a*, 14*b*—spring; 15—bonnet; 151—through hole; 30—breathable membrane; 50—gas barrier structure; 501—opening-closing seam; 51*a*, 51*b*, 51*c*—first barrier member; 511—first fixing portion; 512—first opening-closing portion; 52*a*, 52*b*, 52*c*—second barrier member; 521—second fixing portion; 522—second opening-closing portion; 53*b*, 53*c*—base; 531*b*, 531*c*—first through hole; 532*b*, 532*c*—second through hole; 54*a*, 54*b*—first elastic member; 55*a*, 55*b*—first limiting member; 56*a*, 56*b*—second elastic member; 57*a*, 57*b*—second limiting member; 58—fixing Point; 800—battery; 81—box; 900—vehicle; 91—controller; 92—motor.

DETAILED DESCRIPTION OF THE EMBODIMENTS

In order to make the purpose, technical solutions and advantages of the embodiments of the present application clearer, the technical solutions in the embodiments of the present application will be described in the following clearly and completely in conjunction with the accompanying drawings in the embodiments of the present application. Obviously, the described embodiments are part of the embodiments of the present application, but not all of the embodiments. The components of the embodiments of the present application generally described and shown in the drawings herein may be arranged and designed in various different configurations.

Therefore, the following detailed description of the embodiments of the present application provided in the accompanying drawings is not intended to limit the claimed scope of the present application, but merely represents selected embodiments of the present application. Based on the embodiments in the present application, all other embodiments obtained by those of ordinary skill in the art without creative work shall fall within the protection scope of the present application.

It should be noted that similar reference numerals and letters indicate similar items in the following drawings. Therefore, once a certain item is defined in one drawing, it does not need to be further defined and explained in the subsequent drawings.

In the description of the present application, the terms "first", "second", etc. are only used to distinguish the description, and cannot be understood as indicating or implying relative importance. It should also be noted that, unless otherwise clearly specified and limited, the terms "arrange" and "connect" should be understood in a broad sense, for example, it can be a fixed connection, a detachable connection, or an integral connection; and, it can be a direct connection, an indirect connection through an intermediate medium, or an internal communication between two elements. For those of ordinary skill in the art, the specific meaning of the above-mentioned terms in this application can be understood under specific circumstances.

The orientation words appearing in the following description are all directions shown in the figures, and do not limit the specific structure of the present application. In the description of this application, it should also be noted that, unless otherwise clearly defined and limited, the terms "install", "connect", and "connection" should be understood in a broad sense, for example, it may be a fixed connection or an detachable connection, or an integral connection; and, it can be direct connection or indirect connection through an intermediate medium. For those of ordinary skill in the art, the specific meaning of the above-mentioned terms in this application can be understood under specific circumstances.

As shown in FIG. 1, it is a simplified schematic diagram of a vehicle 900 according to an embodiment of the present application. The vehicle 900 may be a fuel vehicle, a gas vehicle, or a new energy vehicle, and the new energy vehicle may be a pure electric vehicle, a hybrid vehicle, or a range-extended vehicle. As shown in FIG. 1, a battery 800 may be provided inside the vehicle 900, for example, a battery 800 may be provided on the bottom or the front or rear of the vehicle 900. The battery 800 may be used to power the vehicle 900, for example, the battery 800 may be used as an operating power source of the vehicle 900. In addition, the vehicle 900 may further include a controller 91 and a motor 92. The controller 91 is used to control the battery 800 to supply power to the motor 92, for example, for starting, navigating, and working power requirements during driving of the vehicle 900. In another embodiment of the present application, the battery 800 can be used not only as the operating power source for the vehicle 900, but also as a driving power source for the vehicle 900, replacing or partially replacing fuel or natural gas to provide driving power to the vehicle 900. The battery 800 referred to below can also be understood as a battery pack including a plurality of battery cells.

The battery 800 mentioned in the embodiment of the present application refers to a single physical module including one or more battery cells to provide higher voltage and capacity. For example, the battery 800 mentioned in the present application may include a battery module or a battery pack. The battery cell includes a positive pole piece, a negative pole piece, electrolyte and a isolation membrane, which are the basic structural units that make up the battery module and the battery pack. Battery cells are generally divided into three types according to the way of packaging: cylindrical battery cells, square battery cells and soft-pack battery cells.

A plurality of the battery cells can be connected in series and/or in parallel via electrode terminals for various applications. In some high-power applications such as electric vehicles, the application of the battery 800 includes three levels: battery cell, battery module, and battery pack. The battery module is formed by electrically connecting a certain number of battery cells together and putting them into a frame in order to protect the battery cells from external shock, heat, vibration, etc. The battery pack is the final state of a battery system installed in the electric vehicle. Most of the current battery packs are made by assembling various control and protection systems such as a battery management system and a thermal management component on one or more battery modules. With the development of technology, the level of battery modules can be omitted, that is, battery packs are directly formed from battery cells. This improvement allows the weight energy density and volume energy density of the battery system to be increased while the number of parts is significantly reduced. The battery mentioned in the present application includes a battery module or a battery pack.

Figure 2:
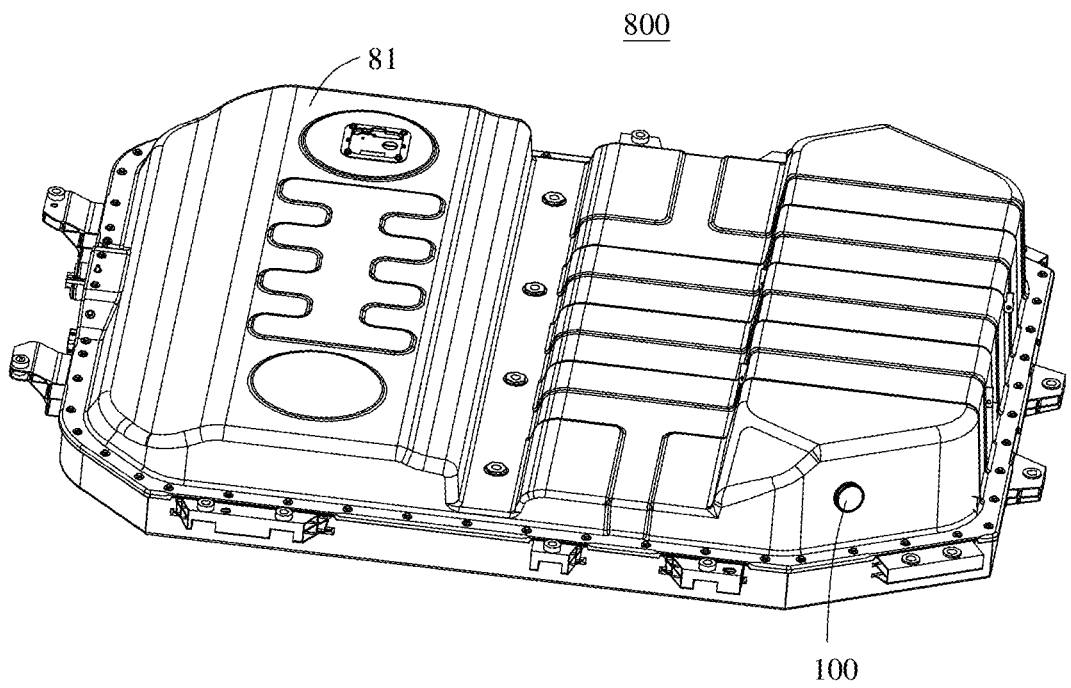
FIG. 2 is a schematic structural diagram of an embodiment of a battery provided in this application.

In order to solve or at least partially solve the problem that the battery in the prior art requires ventilation and other potential problems, the inventor of the present application proposes a battery 800. As shown in FIG. 2, the battery 800 includes a box 81 and a battery cell (not shown in the figure) and a balance valve 100, the battery cell is arranged in the box 81, and the balance valve 100 is arranged on the box 81. When the gas pressure inside and/or outside the box 81 changes, the balance valve 100 can be opened to balance the gas pressure inside and outside the box 81, so as to balance the gas pressure inside and outside the box 81 to realize the ventilation of the box 81. It is understood that the battery described in the embodiments of the present application is suitable for various devices that use batteries, such as mobile phones, portable devices, notebook, battery cars, electric cars, ships, spacecrafts, electric toys and electric tools, etc. For example, the spacecrafts include airplanes, rockets, space shuttles and spaceships, etc., and the electric toys include fixed or mobile electric toys, such as game consoles, electric car toys, electric ship toys and electric airplane toys, etc., while the electric tools include metal cutting power tools, grinding power tools, assembly power tools and railway power tools, such as electric drills, electric grinders, electric wrenches, electric screwdrivers, electric hammers, impact drills, concrete vibrators and electric planers.

The battery described in the embodiment of the present application is not only applicable to the above-described power consumption apparatus, but also applicable to all equipment that uses the battery.

The embodiment of the present application provides a balance valve, which is arranged on an enclosed cavity and used to balance the gas pressures inside the enclosed cavity and the outside. In the embodiment of the present application, the enclosed cavity is described by taking the box of the battery as an example.

In the following, for the convenience of description, the side close to the inside of the enclosed cavity is defined as "inside", and the side far away from the inside of the enclosed cavity is defined as "outside". In the figures, the letter I is used to indicate "inside" and the letter O is used to indicate "outside".

Figure 3:
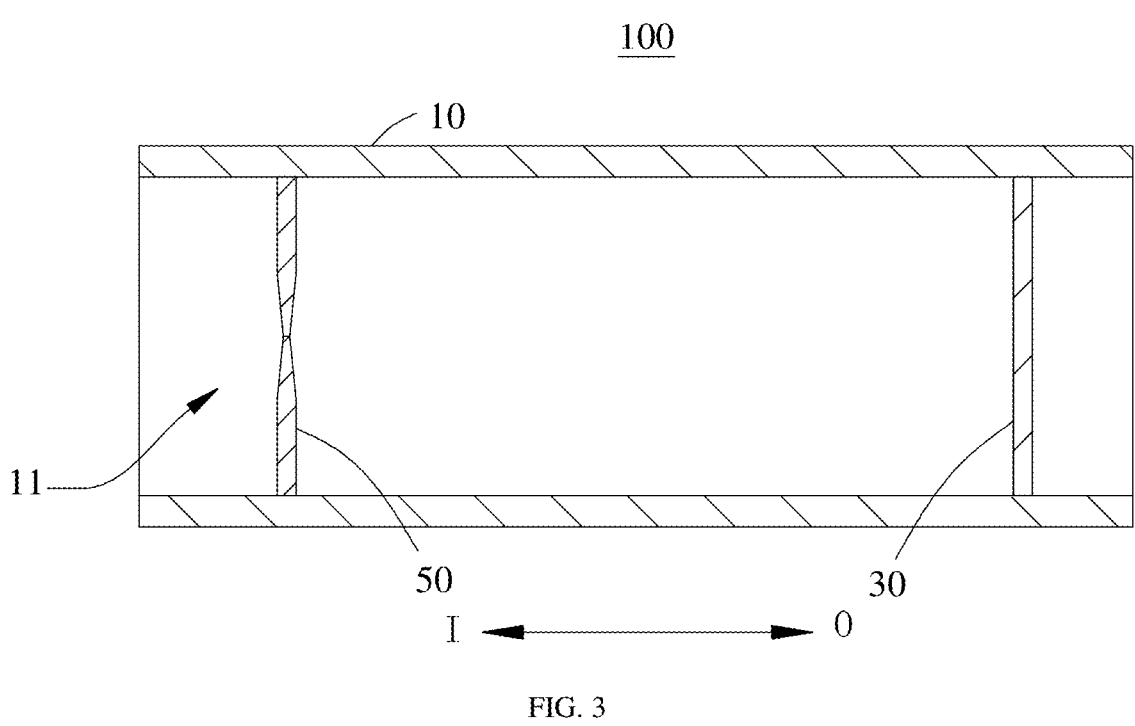
FIG. 3 is a schematic structural diagram of an embodiment of a balance valve provided in this application.
Figure 4:
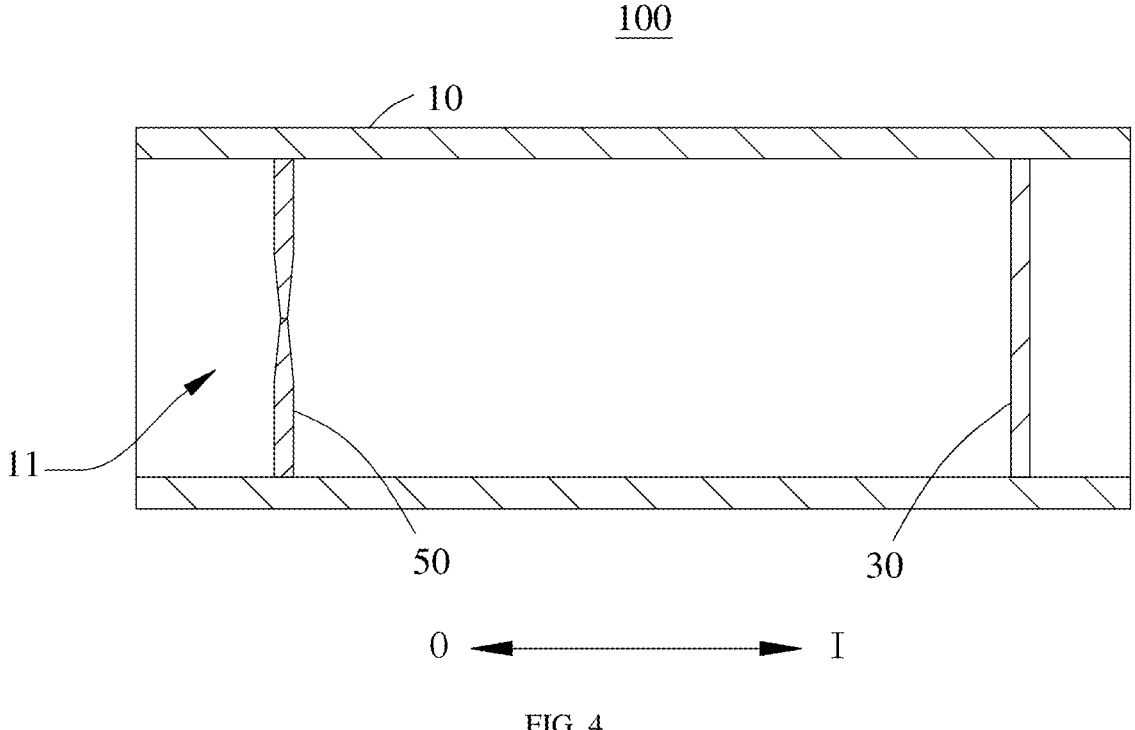
FIG. 4 is a schematic structural diagram of another embodiment of a balance valve provided in this application.

Please refer to FIG. 3 and FIG. 4, which are schematic diagrams of the structure of the balance valve 100. The balance valve 100 includes a body 10, a breathable membrane 30 and a gas barrier structure 50. The body 10 is provided with a ventilation channel 11, and the inside and the outside of the enclosed cavity are in gas communication through the ventilation channel 11. The breathable membrane 30 is arranged at one end of the ventilation channel 11, and the gas barrier structure 50 is arranged at the other end of the ventilation channel 11. The breathable membrane 30 is used to maintain the gas circulation of the ventilation channel 11, and the breathable membrane 30 can block dust and water, but cannot block water vapor.

It should be noted that the above "the breathable membrane is arranged at one end of the ventilation channel, and the gas barrier structure is arranged at the other end of the ventilation channel" only means that the breathable membrane and the gas barrier structure are arranged at intervals along the extending direction of the ventilation channel, and is not limited to that the breathable membrane and the gas barrier structure must be located near the two end surfaces of the ventilation channel. It should be understood that the breathable membrane and/or gas barrier structure may also be arranged inside the ventilation channel.

In the embodiment of the present application, when the gas pressures inside and outside the gas barrier structure 50 are balanced, the gas barrier structure 50 is configured to close the ventilation channel 11; when the gas pressures inside and outside the gas barrier structure 50 are unbalanced, the gas barrier structure 50 is configured to open the ventilation channel 11 to achieve the gas pressure balance between the inside and outside of the gas barrier structure 50. By providing the gas barrier structure 50, the gas barrier structure 50 opens the ventilation channel 11 only when the pressures on both sides of the gas barrier structure 50 are unbalanced, and closes the ventilation channel 11 when they are balanced, thereby preventing the water vapor from continuously entering the inside of the enclosed cavity by passing through the breathable membrane 30, and effectively reducing the water vapor entering the enclosed cavity, which reduces the accumulation of condensed water in the enclosed cavity, and prolongs the service life of the electrical elements in the battery box using the balance valve 100.

The gas barrier structure 50 of the present application may include any appropriate structure as long as it can achieve the above-mentioned gas barrier function.

Figures 5, 6:
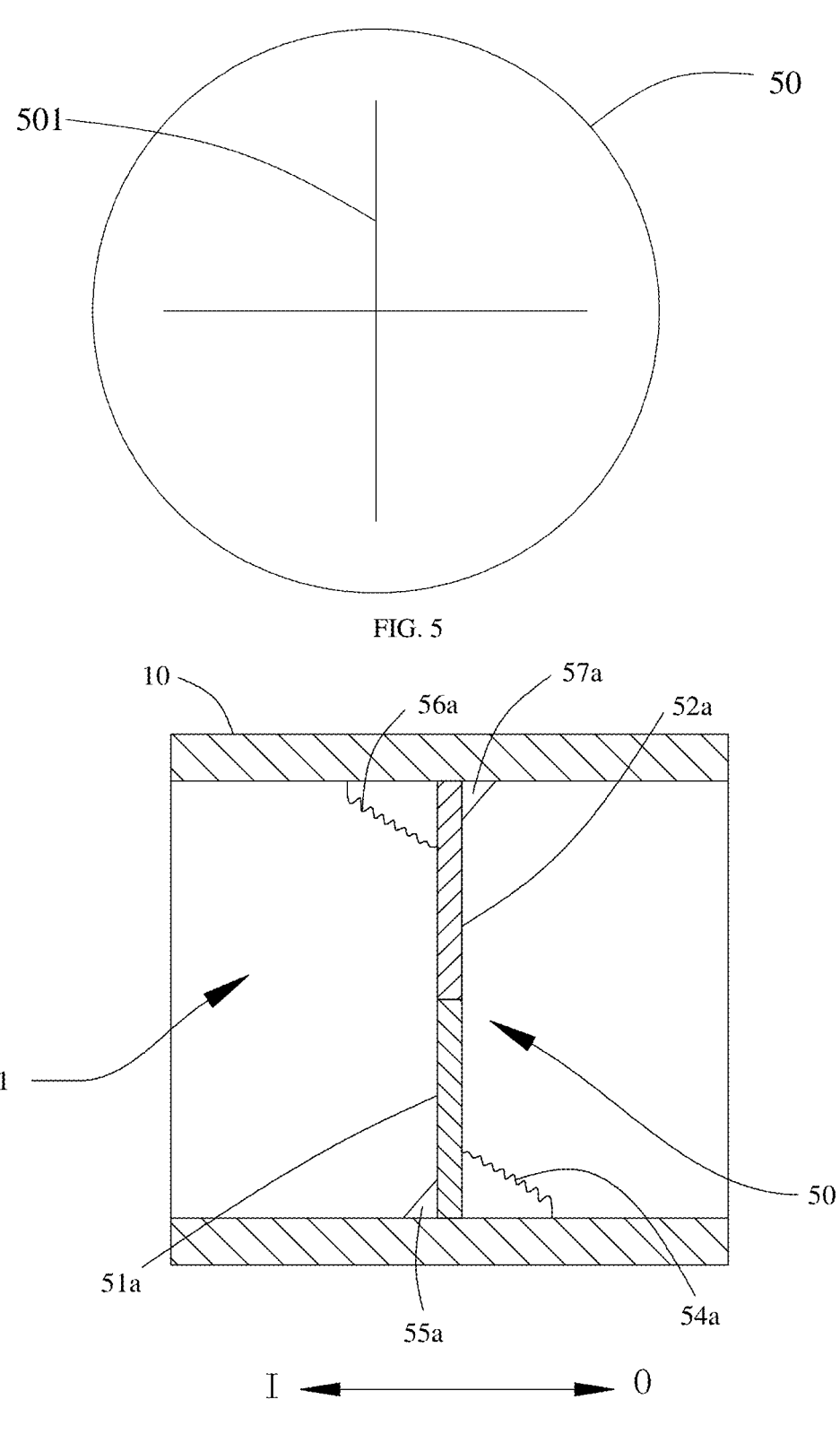
FIG. 5 is a schematic structural diagram of an embodiment of a gas barrier structure of a balance valve provided in this application.
FIG. 6 is a schematic structural diagram of another embodiment of a gas barrier structure of a balance valve provided in this application.

In one embodiment, as shown in FIG. 5, the gas barrier structure 50 may be a membrane formed of an elastic material, where the outer edge of the membrane is fixed to the ventilation channel 11 (as shown in FIG. 3 and FIG. 4), and an opening-closing seam 501 is provided on the membrane. The opening-closing seam 501 is closed and the gas on both sides of the membrane cannot flow through when the gas pressures on both sides are balanced. When the gas pressures on both sides are unbalanced, the opening-closing seam 501 is opened to allow the gas to pass through.

Further, the opening-closing seam 501 can be located at the center of the membrane, so that the force on the membrane is uniform, and the service life of the membrane is prolonged.

The number of the opening-closing seams 501 may be one or more. In an embodiment, there are two opening-closing seams 501, and the two opening-closing seams 501 cross each other, which can ensure the flowing amount of the gas when opening-closing, and avoid excessive gas flow from breaking through the membrane.

In one embodiment, referring to FIG. 6, the gas barrier structure 50 includes a first barrier member 51a, a second barrier member 52a, a first elastic member 54a, and a second elastic member 56a. One end of the first barrier member 51a and the ventilation channel 11 are connected, while the other end of the first barrier member 51a is a free end. The first elastic member 54a is used to maintain the first barrier member 51a in an initial position. One end of the second barrier member 52a is connected to the ventilation channel 11, while the other end of the second barrier member 52a is a free end. The second elastic member 56a is used to maintain the second barrier member 52a in an initial position. When the first barrier member 51a and the second barrier member 52a are both in initial positions, the first barrier member 51a and the second barrier member 52a are configured to jointly close the ventilation channel 11. When the gas pressure inside the gas barrier structure 50 is greater than the gas pressure outside, the first barrier member 51a is configured to be able to open unidirectionally to the outside, so that the gas inside the gas barrier structure 50 flows to the outside until the gas pressure inside the gas barrier structure 50 is balanced with the gas pressure outside. When the gas pressure outside the gas barrier structure 50 is greater than the gas pressure inside, the second barrier member 52a is configured to be able to open unidirectionally to the inside, so that the gas outside the gas barrier structure 50 flows inward until the gas pressure outside the gas barrier structure 50 is balanced with the gas pressure inside. When the gas pressure outside and the gas pressure inside the gas barrier structure 50 are balanced, the first barrier member 51a and the second barrier member 52a are both in the initial positions. At this time, the first barrier member 51a and the second barrier member 52a prevent the gas inside the gas barrier structure 50 from exchanging with the gas outside to prevent the water vapor outside from continuously entering the inside of the gas barrier structure 50.

Further, in order to prevent the first barrier member 51a from moving towards the inside, the gas barrier structure 50 further includes a first limiting member 55a which is arranged inside the first barrier member 51a. When the first barrier member 51a is in the initial position, the first limiting member 55a can prevent the first barrier member 51a from moving towards the inside, so that the first barrier member 51a can be unidirectionally opened towards the outside. In order to prevent the second barrier member 52a from moving towards the outside, the gas barrier structure 50 further includes a second limiting member 57a. The second limiting member 57a is arranged outside the second barrier member 52a. When the second barrier member 52a is in the initial position, the second limiting member 57a can prevent the second barrier member 52a from moving towards the outside, so that the second barrier member 52a can be unidirectionally opened towards the inside.

Figure 7:
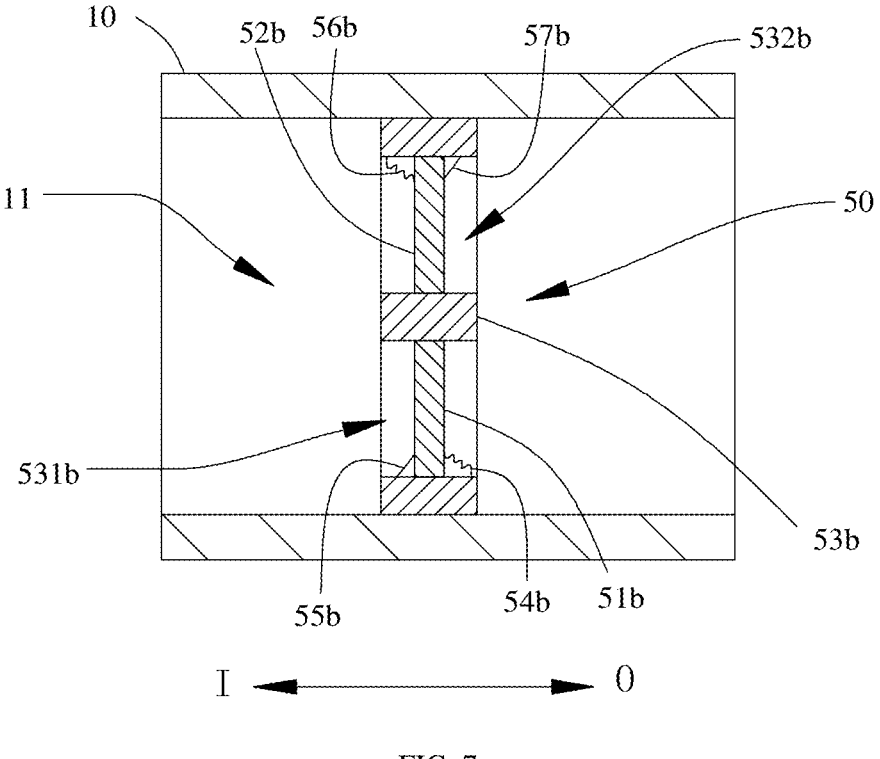
FIG. 7 is a schematic structural diagram of a further embodiment of a gas barrier structure of a balance valve provided in this application.

In one embodiment, as shown in FIG. 7, the gas barrier structure 50 includes a first barrier member 51b, a second barrier member 52b, and a base 53b. The base 53b is provided with a first through hole 531b and a second through hole 532b, and both the first through hole 531b and the second through hole 532b are in communication with the ventilation channel 11. The first barrier member 51b is arranged in the first through hole 531b, and the second barrier member 52b is arranged in the second through hole 532b.

The base 53b is arranged in the ventilation channel 11, and the base 53b serves as an installation basis of the first barrier member 51b and the second barrier member 52b. By arranging the first barrier member 51b in the first through hole 531b and the second barrier member 52b in the second through hole 532b, the structure of the gas barrier structure 50 is compact and the space occupied is small.

When the gas pressure inside the gas barrier structure 50 is greater than the gas pressure outside, the first barrier member 51b is configured to open the first through hole 531b. At this time, the second barrier member 52b is configured to block the second through hole 532b, and the gas inside the gas barrier structure 50 flows to the outside of the gas barrier structure 50 through the first through hole 531b. When the gas pressure outside the gas barrier structure 50 is greater than the gas pressure inside, the second barrier member 52b is configured to open the second through hole 532b. At this time, the first barrier member 51b is configured to block the first through hole 531b, and the gas outside the gas barrier structure 50 flows to the inside of the gas barrier structure 50 through the second through hole 532b. When the gas pressure outside the gas barrier structure 50 is balanced with the gas pressure inside, the first barrier member 51b blocks the first through hole 531b, and the second barrier member 52b blocks the second through hole 532b. At this time, the first barrier member 51b and the second barrier member 52b are both in the initial positions, the gas inside and outside the gas barrier structure 50 do not exchange.

Through the match of the first barrier member 51b and the first through hole 531b, and the match of the second barrier member 52b and the second through hole 532b, the corresponding through hole can be opened or closed according to the gas pressure difference between the inside and outside of the gas barrier structure 50 to achieve the gas pressure balance between the inside and outside of the gas barrier structure 50.

Further, in order to enable the first barrier member 51*b* to be reset to block the first through hole 531*b* after being opened, and to enable the second barrier member 52*b* to be reset to block the second through hole 532*b* after being opened, the gas barrier structure 50 further includes a first elastic member 54*b*, a second elastic member 56*b*, where one end of the first barrier member 51*b* is connected to the wall of the first through hole 531*b*, and the other end of the first barrier member 51*b* is a free end. The first elastic member 54*b* is used to maintain the first barrier member 51*b* in the initial position. One end of the second barrier member 52*b* is connected to the wall of the second through hole 532*b*, and the other end of the second barrier member 52*b* is a free end. The second elastic member 56*b* is used to maintain the second barrier member 52*b* in the initial position.

Further, in order to realize that the first barrier member 51*b* and the second barrier member 52*b* can be opened at one side, the gas barrier structure 50 further includes a first limiting member 55*b* and a second limiting member 57*b*. The first limiting member 55*b* is arranged inside the first barrier member 51*b*. When the first barrier member 51*b* is in the initial position, the first limiting member 55*b* can prevent the first barrier member 51*b* from moving towards the inside. The second limiting member 57*b* is arranged outside the second barrier member 52*b*. When the second barrier member 52*b* is in the initial position, the second limiting member 57*b* can prevent the second barrier member 52*b* from moving towards the outside.

Figure 8:
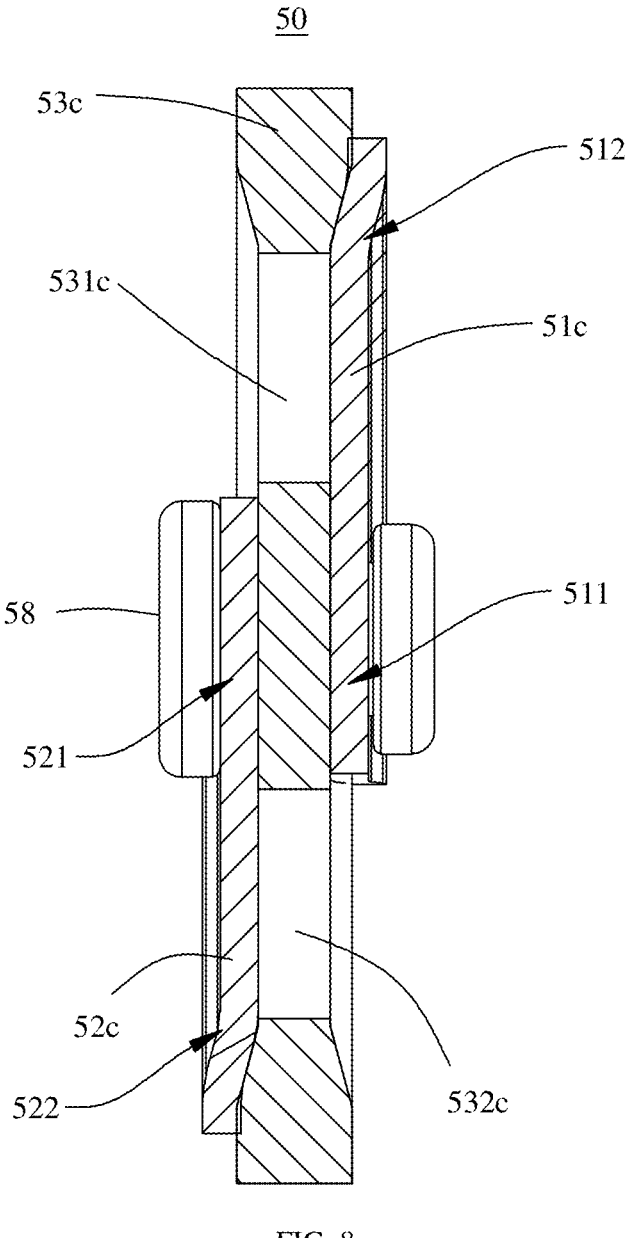
FIG. 8 is a schematic structural diagram of a still another embodiment of a gas barrier structure of a balance valve provided in this application.

In one embodiment, referring to FIG. 8, the gas barrier structure 50 includes a first barrier member 51*c*, a second barrier member 52*c*, and a base 53*c*. The base 53*c* is provided with a first through hole 531*c* and a second through hole 532*c*, and both the first through hole 531*c* and the second through hole 532*c* are in communication with the ventilation channel 11. The first barrier member 51*c* and the second barrier member 52*c* are respectively arranged at opposite sides of the base 53*c*. The first barrier member 51*c* is configured to block the first through hole 531*c* and expose the second through hole 532*c*. The second barrier member 52*c* is configured to block the second through hole 532*c* and expose the first through hole 531*c*.

The base 53*c* is arranged in the ventilation channel 11, and the base 53*c* serves as an installation basis of the first barrier member 51*c* and the second barrier member 52*c*. By arranging the first barrier member 51*c* and the second barrier member 52*c* at both sides of the base 53*c*, it is convenient to realize the installation of the first barrier member 51*c* and the second barrier member 52*c*.

When the gas pressure inside the gas barrier structure 50 is greater than the gas pressure outside, the first barrier member 51*c* can open the first through hole 531*c*, and the second barrier member 52*c* can block the second through hole 532*c*, so that gas can flow from the inside of the gas barrier structure 50 towards the outside through the first through hole 531*c* until the gas pressures inside and outside the gas barrier structure 50 are balanced. Conversely, when the gas pressure outside the gas barrier structure 50 is greater than the gas pressure inside, the second barrier member 52*c* can open the second through hole 532*c*, and the first barrier member 51*c* can block the first through hole 531*c*, so that gas can flow from the outside of the gas barrier structure 50 towards the inside through the second through hole 532*c* until the gas pressures inside and outside the gas barrier structure 50 are balanced. When the gas pressures outside and the gas pressure inside the gas barrier structure 50 are balanced, the first barrier member 51*c* blocks the first through hole 531*c*, and the second barrier member 52*c* blocks the second through hole 532*c*. The gas inside and outside the gas barrier structure 50 do not exchange with each other.

In an embodiment, the bases 53*b* and 53*c* may be fixed to the ventilation channel 11, for example, by means of interference fit, welding, bonding, or bolting between the bases 53*b* and 53*c* and the ventilation channel 11. The bases 53*b* and 53*c* can also be floated and arranged in the ventilation channel 11, that is, the bases 53*b* and 53*c* can make a piston-like movement in the ventilation channel 11. By floating and arranging the bases 53*b* and 53*c* in the ventilation channel 11, the movement of the bases 53*b* and 53*c* can be used to buffer the partial gas pressure, and the service life of the gas barrier structure 50 can be prolonged.

Figure 9:
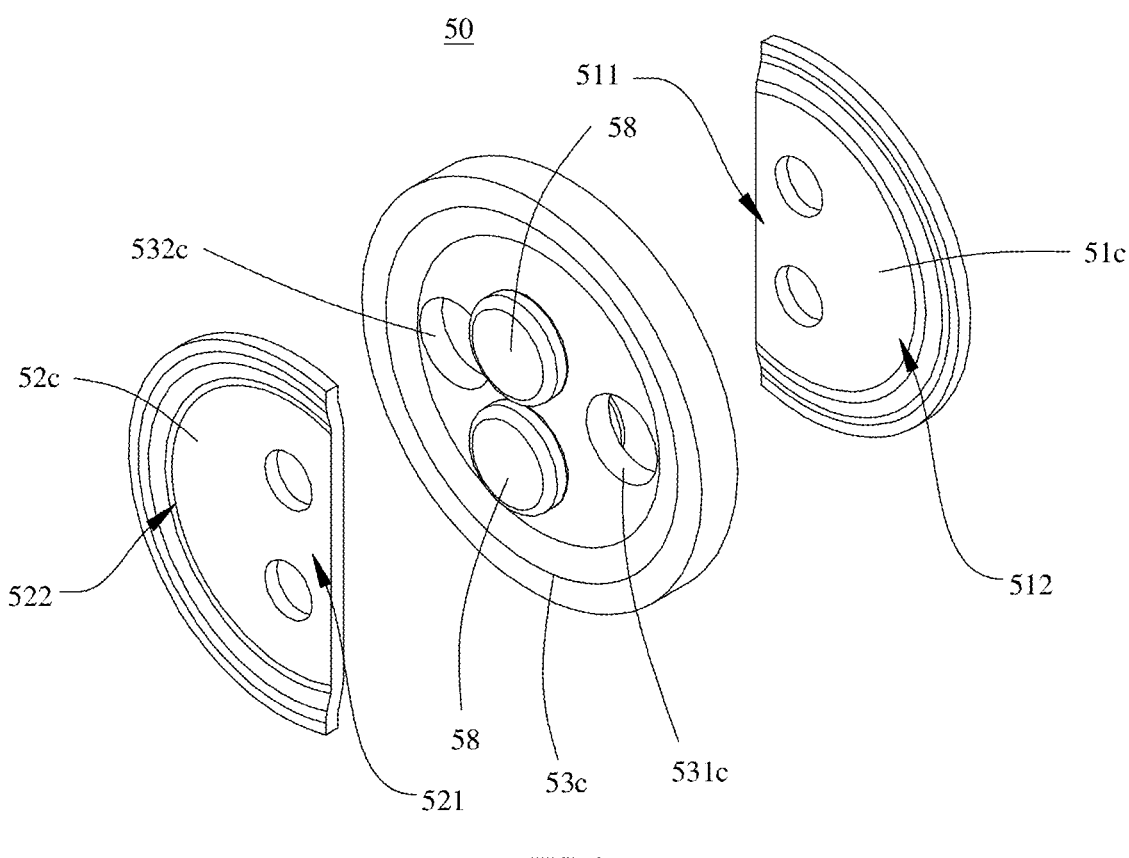
FIG. 9 is an exploded view of the still another embodiment of the gas barrier structure of the balance valve provided in this application.

In an embodiment, as shown in FIG. 9, the first barrier member 51*c* and the second barrier member 52*c* may be of valve structures. The first barrier member 51*c* and the second barrier member 52*c* having the valve structures are easy to open following the change of the gas pressure, which facilitates the balance of the gas pressure inside and outside the gas barrier structure 50. The material of the valve structure here can be, but is not limited to, an elastic material (such as rubber or silicone), which can be deformed in response to changes in gas pressures inside and outside to open or close the corresponding through holes.

Further, the first barrier member 51*c* includes a first fixing portion 511 and a first opening-closing portion 512 that are connected, and the second barrier member 52*c* includes a second fixing portion 521 and a second opening-closing portion 522 that are connected, and both the first fixing portion 511 and the second fixing portion 521 are fixed to the base 53*c*. The first fixing portion 511 and the second fixing portion 521 are both fixed to the base 53*c* to realize the connection between the first barrier member 51*c* and the second barrier member 52*c* and the base 53*c*. The first opening-closing portion 512 can be attached to or detached from the base 53*c*, so as to block the first through hole 531*c* or open the first through hole 531*c*. The second opening-closing portion 522 can be attached to or detached from the base 53*c*, so as to block the second through hole 532*c* or open the second through hole 532*c*. In this embodiment, when the gas pressures on both sides are unbalanced, the first barrier member 51*c* or the second barrier member 52*c* is elastically deformed to realize the opening of the through hole. After the gas pressures on both sides are balanced, the first barrier member 51*c* or the second barrier member 52*c* are automatically restored to block the through hole, so there is no need to additionally provide an elastic reset member, resulting in the simplified structure of the gas barrier structure 50, the simple assembly, and the lower cost.

When the gas pressures outside and inside the gas barrier structure 50 are balanced, the first opening-closing portion 512 and the second opening-closing portion 522 are both attached to the base 53*c*, where the first opening-closing portion 512 blocks the first through hole 531*c*, and the second opening-closing portion 522 blocks the second through hole 532*c*. At this time, the gas inside and outside the gas barrier structure 50 do not circulate. When the gas pressure inside the gas barrier structure 50 is greater than the gas pressure outside, the first opening-closing portion 512 is detached from the base 53*c* to open the first through hole 531*c*. At this time, the second opening-closing portion 522 blocks the second through hole 532*c*, and the gas inside the gas barrier structure 50 can flow to the outside through the first through hole 531c. When the gas pressure outside the gas barrier structure 50 is greater than the gas pressure inside, the second opening-closing portion 522 is detached from the base 53c to open the second through hole 532c. At this time, the first opening-closing portion 512 blocks the first through hole 531c, and the gas outside the gas barrier structure 50 can flow inward through the second through hole 532c.

Further, the first fixing portion 511 is fixed to the base 53c by at least two fixing points, and/or the second fixing portion 521 is fixed to the base 53c by at least two fixing points. The first fixing portion 511 and the second fixing portion 521 are respectively fixed to the base 53c through at least two fixing points, ensuring that the first barrier member 51c and the second barrier member 52c do not rotate relative to the base 53c when the corresponding through hole is opened.

Optionally, the first fixing portion 511 is fixed to the base 53c by at least two fixing points, and the second fixing portion 521 is also fixed to the base 53c by at least two fixing points.

Preferably, as shown in FIG. 8 and FIG. 9, the first fixing portion 511 and the second fixing portion 521 are jointly fixed to the base 53c by two fixing points 58, and the first fixing portion 511, the base 53c and the second fixing portion 521 are fixed by the two fixing points 58, which makes the gas barrier structure 50 more compact as a whole and saves installation space. In an embodiment, the fixing points 58 may be rivets to ensure the connection strength of the first fixing portion 511, the second fixing portion 521 and the base 53c. In other embodiments, the fixing points 58 may also be fasteners such as bolts and screws.

It should be pointed out that the opening pressures of the first barrier members 51a, 51b, 51c and the second barrier members 52a, 52b, 52c may be the same or different. When the opening pressures of the first barrier members 51a, 51b, 51c and the second barrier members 52a, 52b, 52c are different, the opening pressures of the second barrier members 52a, 52b, 52c may be greater than the opening pressures of the first barrier members 51a, 51b, 51c, so that the gas in the enclosed cavity can easily flow to the outside, while the external gas cannot easily enter the enclosed cavity.

Therefore, in an embodiment, the elastic coefficients of the second elastic members 56a, 56b may be greater than the elastic coefficients of the first elastic members 54a, 54b, so that the opening pressures of the second barrier members 52a, 52b are greater than that of the first barrier members 51a, 51b.

In an embodiment, the thickness of the second barrier member 52c may be greater than the thickness of the first barrier member 51c, so that the second barrier member 52c is more difficult to deform than the first barrier member 51c, thereby making the opening pressure of the second barrier member 52c be greater than the opening pressure of the first barrier member 51c.

Optionally, the cross-sectional area of the second through hole 532c is smaller than the cross-sectional area of the first through hole 531c, so that the gas inside the enclosed cavity is more easily discharged to the outside.

In the present application, the ventilation channel 11 includes opposite inner end and outer end, where the inner end refers to the end close to the inside of the enclosed cavity, and the outer end refers to the end close to the outside. In one embodiment, the gas barrier structure 50 may be arranged at a position close to the inner end of the ventilation channel 11, and the breathable membrane 30 may be arranged near the outer end of the ventilation channel 11, which can effectively prevent dust and the like from entering the ventilation channel 11 and accumulating between the breathable membrane 30 and the gas barrier structure 50 to form blockage. In another embodiment, the gas barrier structure 50 may be arranged at a position close to the outer end of the ventilation channel 11, and the breathable membrane 30 may be arranged at a position close to the inner end of the ventilation channel 11.

Figure 10:
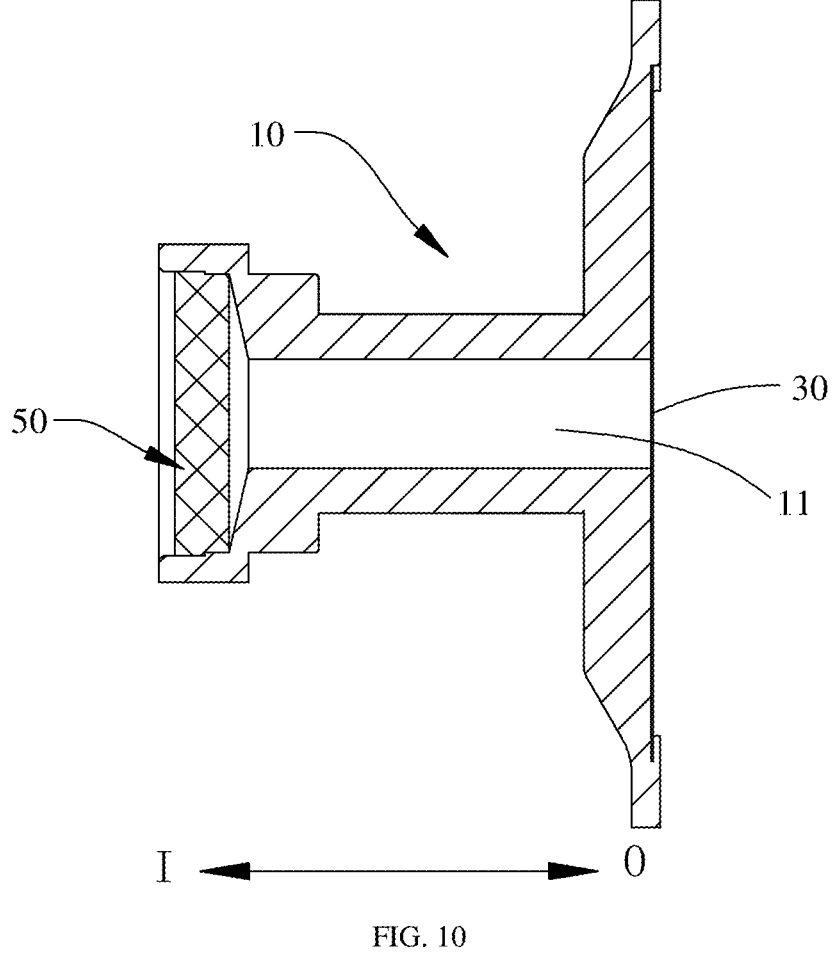
FIG. 10 is a cross-sectional view of an embodiment of the body of a balance valve provided in this application.

In an embodiment, as shown in FIG. 10, the body 10 may be an integral structure. In this case, the body 10 can be fixed on the enclosed cavity.

Figure 11:
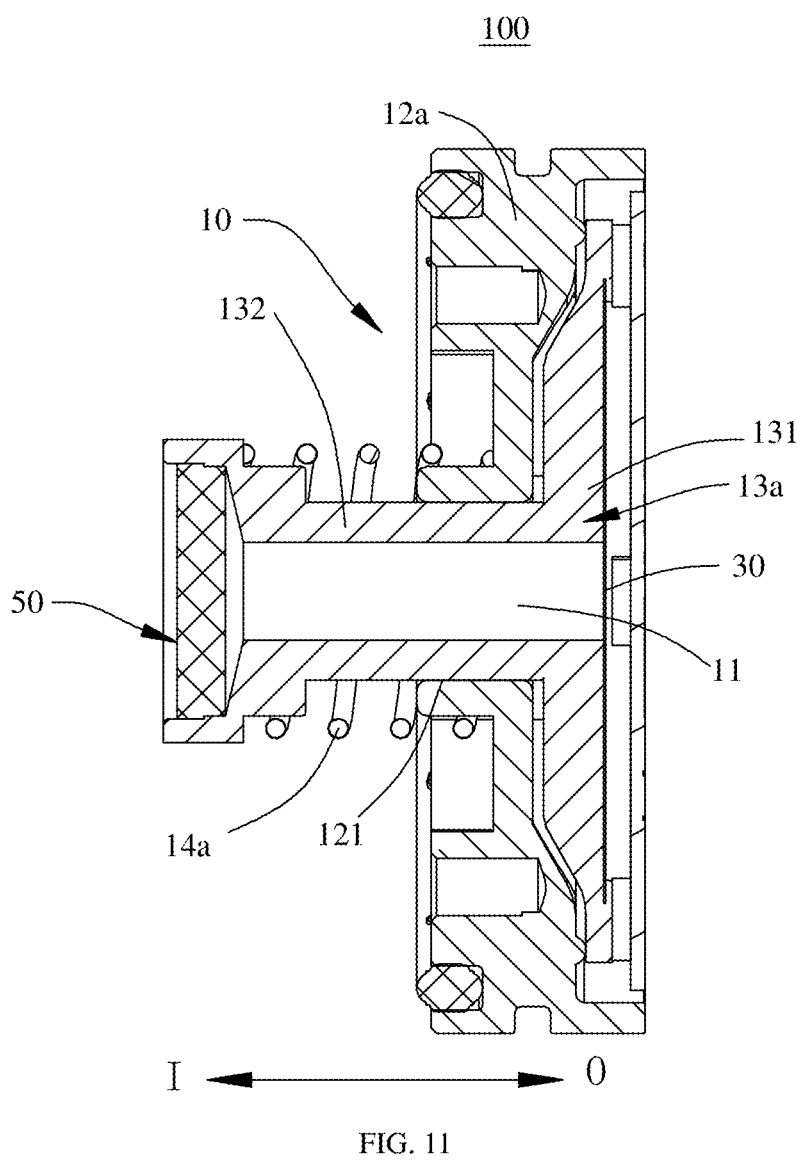
FIG. 11 is a cross-sectional view of another embodiment of the body of a balance valve provided in this application.
Figure 12:
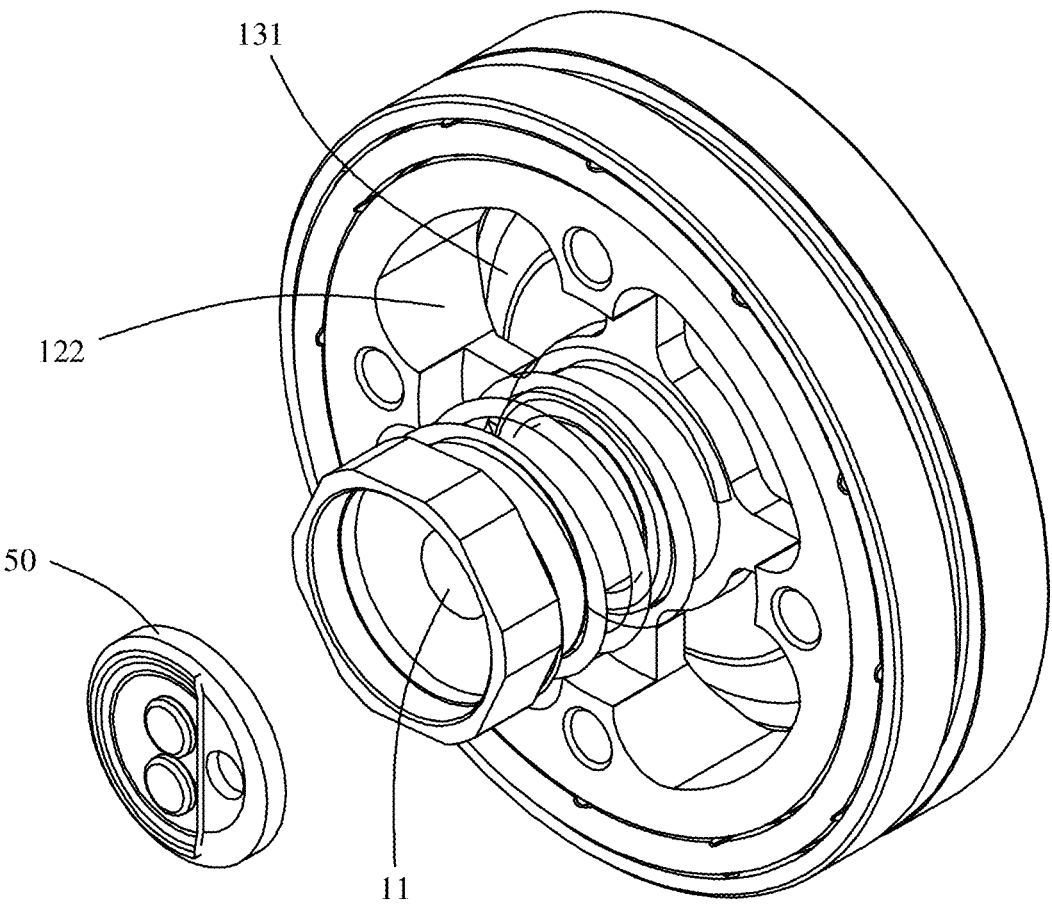
FIG. 12 is an axonometric exploded view of the another embodiment of the body of the balance valve provided in this application.
Figure 13:
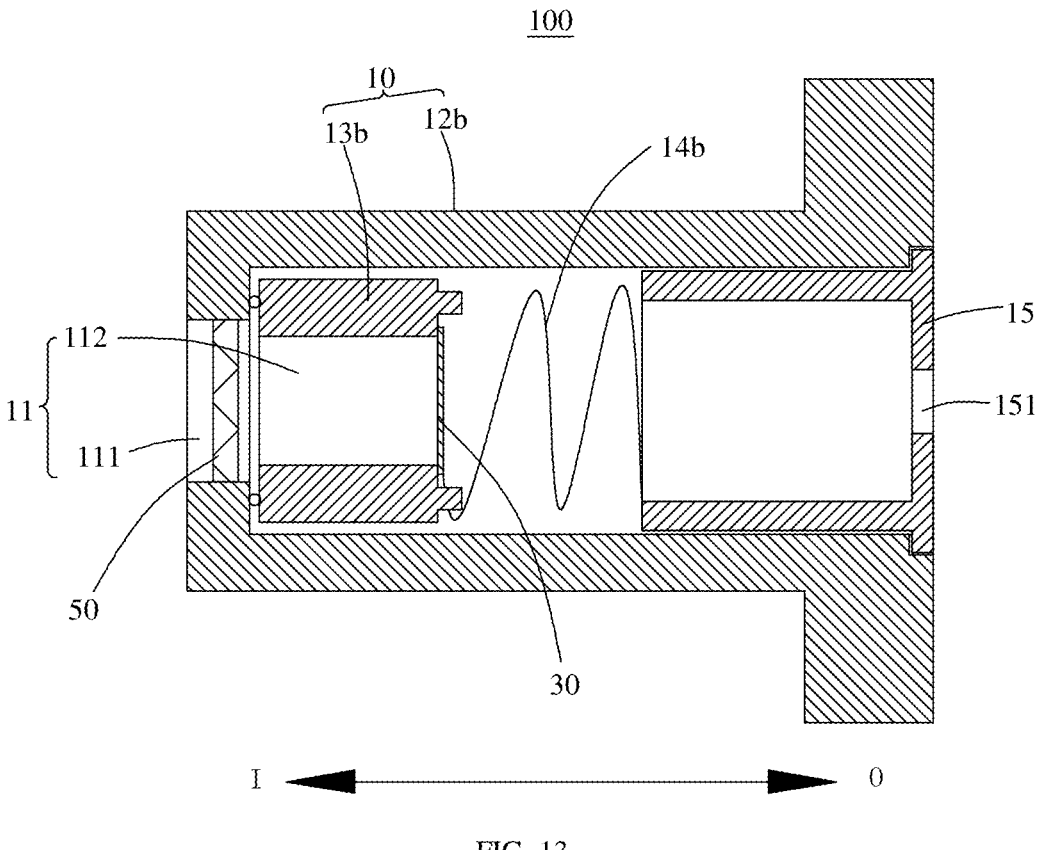
FIG. 13 is a cross-sectional view of a still another embodiment of the body of a balance valve provided in this application.

As shown in FIG. 11, FIG. 12 and FIG. 13, the body 10 may also be a split structure, and the body 10 includes a valve body 12a and a valve core 13a. The valve body 12a is used to be fixed on the enclosed cavity, and the valve core 13a is used to be movably installed on the valve body 12a.

In one embodiment, as shown in FIG. 11, the ventilation channel 11 may be provided in the valve core 13a, and the breathable membrane 30 and the gas barrier structure 50 are both fixed to the valve core 13a.

As shown in FIG. 11 and FIG. 12, the valve body 12a is provided with a guide hole 121 and a gas vent 122. The guide hole 121 is used to guide the valve core 13a, and the gas vent 122 is used for communication of the inside and outside of the enclosed cavity. The valve core 13a includes a piston 131 and a guide post 132. One end of the guide post 132 is connected to the piston 131, and the other end of the guide post 132 is used to movably pass through the guide hole 121. The piston 131 is used to abut against the valve body 12a, and the piston 131 covers the gas vent 122. The ventilation channel 11 penetrates the guide post 132 and the piston 131 to facilitate the installation of the breathable membrane 30 and the gas barrier structure 50.

Furthermore, the balance valve 100 further includes a spring 14a that is elastically supported between the guide post 132 and the valve body 12a. The spring 14a is used to push the piston 131 against the valve body 12a so that the piston 131 covers the gas vent 122. When the gas pressure inside the enclosed cavity is much greater than the gas pressure outside, the gas pressure inside the enclosed cavity overcomes the elastic force of the spring 14a to open the piston 131 so as to open the gas vent 122, so that the gas inside the enclosed cavity discharges through the gas vent 122 quickly, and therefore the gas pressure inside the enclosed cavity is balanced with the gas pressure outside, which has an explosion-proof function.

Preferably, the breathable membrane 30 is arranged on the piston 131, and the gas barrier structure 50 is arranged on the end of the guide post 132 away from the piston 131. This arrangement can block external dust and liquid water at the outer end of the ventilation channel 11 so that external dust and liquid water cannot enter the ventilation channel 11. In other embodiments, the positions of the breathable membrane 30 and the gas barrier structure 50 can also be interchanged, that is, the breathable membrane 30 is arranged at the end of the guide post 132 away from the piston 131, and the gas barrier structure 50 is arranged on the piston 131.

In one embodiment, as shown in FIG. 13, the ventilation channel 11 includes a first section 111 and a second section 112 that communicate with each other. The first section 111 is provided on the valve body 12b, and the second section 112 is provided on the valve core 13b. The breathable membrane 30 can be fixed to the valve core 13b, and the gas barrier structure 50 can be fixed to the valve body 12b.

Specifically, as shown in FIG. 13, the valve body 12b is a hollow structure. Both ends of the valve body 12b are open. One end of the valve body 12*b* is opened to form the first section 111 of the ventilation channel 11, and the other end of the valve body 12*b* is opened for the penetration of the valve core 13*b*. The valve core 13*b* is arranged inside the valve body 12*b* and includes a hollow structure inside, and the hollow structure of the valve core 13*b* forms the second section 112 of the ventilation channel 11. The valve core 13*b* is coaxially arranged with the valve body 12*b*. The open end of the valve body 12*b* away from the first section 111 is provided with a bonnet 15, and the bonnet 15 is provided with a through hole 151 communicating with the inside of the valve body 12*b* and the outside. A spring 14*b* is arranged between the bonnet 15 and the valve core 13*b*. The spring 14*b* presses the valve core 13*b* against the valve body 12*b*, and the valve core 13*b* and the valve body 12*b* are in an enclosed fit. When the ventilation channel 11 is opened, the gas inside the enclosed cavity can exchange with the gas outside through the first section 111, the second section 112 and the through hole 151 of the bonnet 15.

In other embodiments, the breathable membrane 30 and the gas barrier structure 50 may both arranged on the valve body 12*b*, or may also be arranged on the valve core 13*b*, or the breathable membrane 30 may be arranged on the valve body 12*b*, while the gas barrier structure 50 may be arranged on the valve core 13*b*.

Optionally, the breathable membrane 30 is arranged on the valve core 13*b*, and the gas barrier structure 50 is arranged on the valve body 12*b*.

It should be noted that although in the above, it only lists the scenarios where the balance valve 100 is applied to the battery, the present application is not limited to this, and the balance valve 100 can also be applied to other devices with an enclosed cavity.

It should be noted that, in the case of no conflict, the features in the embodiments of the present application can be combined with each other.

The foregoing descriptions are only preferred embodiments of this application, and are not intended to limit the present application. For those skilled in the art, the application can include various modifications and changes. Any modification, equivalent replacement, improvement, etc. made within the spirit and principle of this application shall be included in the protection scopes of this application.

What is claimed is:

1. A balance valve, comprising:
a body, the body being provided with a ventilation channel;
a breathable membrane, the breathable membrane being arranged at one end of the ventilation channel, and the breathable membrane being configured to maintain a gas circulation of the ventilation channel; and
a gas barrier structure, the gas barrier structure being arranged at an other end of the ventilation channel, and the gas barrier structure being configured to close the ventilation channel when gas pressures inside and outside the gas barrier structure are balanced, while the gas barrier structure being configured to open the ventilation channel when the gas pressures inside and outside the gas barrier structure are unbalanced, so as to achieve a balance of the gas pressure inside and outside the gas barrier structure,
wherein the body comprises a valve body and a valve core, the valve core is configured to be movably installed on the valve body, the ventilation channel comprises a first section and a second section communicating with each other, the first section is provided on the valve body, the second section is provided on the valve core, the breathable membrane is fixed to the valve core or valve body, and the gas barrier structure is fixed to the valve core or valve body.

2. The balance valve according to claim 1, wherein the ventilation channel comprises opposite outer end and inner end, the breathable membrane is arranged at the outer end of the ventilation channel, and the gas barrier structure is arranged at the inner end of the ventilation channel.

3. The balance valve according to claim 1, wherein the gas barrier structure comprises a first barrier member and a second barrier member;
when the gas pressure inside the gas barrier structure is greater than the gas pressure outside, the first barrier member is configured to be able to open unidirectionally towards the outside;
when the gas pressure outside the gas barrier structure is greater than the gas pressure inside, the second barrier member is configured to be able to open unidirectionally towards the inside;
when the gas pressure outside the gas barrier structure is balanced with the gas pressure inside, the first barrier member and the second barrier member are configured to close the ventilation channel together.

4. The balance valve according to claim 3, wherein the gas barrier structure further comprises a base, and the base is provided with a first through hole and a second through hole, the first through hole and the second through hole are both in communication with the ventilation channel;
when the gas pressure inside the gas barrier structure is greater than the gas pressure outside, the first barrier member is configured to open the first through hole;
when the gas pressure outside the gas barrier structure is greater than the gas pressure inside, the second barrier member is configured to open the second through hole;
when the gas pressure outside the gas barrier structure is balanced with the gas pressure inside, the first barrier member closes the first through hole, and the second barrier member closes the second through hole.

5. The balance valve according to claim 4, wherein a cross-sectional area of the first through hole is greater than a cross-sectional area of the second through hole.

6. The balance valve according to claim 4, wherein the base is fixed connection to the ventilation channel.

7. The balance valve according to claim 4, wherein the first barrier member and the second barrier member are respectively arranged at opposite sides of the base, the first barrier member is configured to block the first through hole and expose the second through hole, and the second barrier member is configured to block the second through hole and expose the first through hole.

8. The balance valve according to claim 7, wherein both the first barrier member and the second barrier member are valve structures.

9. The balance valve according to claim 8, wherein the thickness of the second barrier member is greater than the thickness of the first barrier member.

10. The balance valve according to claim 8, wherein the first barrier member comprises a first fixing portion and a first opening-closing portion that are connected, the second barrier member comprises a second fixing portion and a second opening-closing portion that are connected, the first fixing portion and the second fixing portion are both fixed to the base;
when the gas pressure outside the gas barrier structure is balanced with the gas pressure inside, the first opening-closing portion and the second opening-closing portion are both attached to the base, wherein the first opening-closing portion blocks the first through hole, while the second opening-closing portion blocks the second through hole;

when the gas pressure inside the gas barrier structure is greater than the gas pressure outside, the first opening-closing portion is detached from the base to open the first through hole;

when the gas pressure outside the gas barrier structure is greater than the gas pressure inside, the second opening-closing portion is detached from the base to open the second through hole.

11. The balance valve according to claim 10, wherein the first fixing portion is fixed to the base through at least two fixing points, and/or the second fixing portion is fixed to the base through at least two fixing points.

12. The balance valve according to claim 11, wherein the gas barrier structure further comprises two rivets, both of the two rivets being configured to pass through the first fixing portion, the base and the second fixing portion so as to realize a fixation of the first barrier member, the second barrier member and the base.

13. A battery, comprising a box, a battery cell and a balance valve, wherein the battery cell is arranged in the box, and the balance valve is arranged on the box and comprises:

a body, the body being provided with a ventilation channel;

a breathable membrane, the breathable membrane being arranged at one end of the ventilation channel, and the breathable membrane being configured to maintain a gas circulation of the ventilation channel; and a gas barrier structure, the gas barrier structure being arranged at an other end of the ventilation channel, and the gas barrier structure being configured to close the ventilation channel when gas pressures inside and outside the gas barrier structure are balanced, while the gas barrier structure being configured to open the ventilation channel when the gas pressures inside and outside the gas barrier structure are unbalanced, so as to achieve a balance of the gas pressure inside and outside the gas barrier structure;

wherein the body comprises a valve body and a valve core, the valve core is configured to be movably installed on the valve body, the ventilation channel comprises a first section and a second section communicating with each other, the first section is provided on the valve body, the second section is provided on the valve core, the breathable membrane is fixed to the valve core or valve body, and the gas barrier structure is fixed to the valve core or valve body.

14. A power consumption apparatus, comprising the battery according to claim 13.

15. The battery according to claim 13, wherein the gas barrier structure comprises a first barrier member and a second barrier member;

when the gas pressure inside the gas barrier structure is greater than the gas pressure outside, the first barrier member is configured to be able to open unidirectionally towards the outside;

when the gas pressure outside the gas barrier structure is greater than the gas pressure inside, the second barrier member is configured to be able to open unidirectionally towards the inside;

when the gas pressure outside the gas barrier structure is balanced with the gas pressure inside, the first barrier member and the second barrier member are configured to close the ventilation channel together.

16. The battery according to claim 15, wherein the gas barrier structure further comprises a base, and the base is provided with a first through hole and a second through hole, the first through hole and the second through hole are both in communication with the ventilation channel;

when the gas pressure inside the gas barrier structure is greater than the gas pressure outside, the first barrier member is configured to open the first through hole;

when the gas pressure outside the gas barrier structure is greater than the gas pressure inside, the second barrier member is configured to open the second through hole;

when the gas pressure outside the gas barrier structure is balanced with the gas pressure inside, the first barrier member closes the first through hole, and the second barrier member closes the second through hole.

17. The battery according to claim 16, wherein the first barrier member and the second barrier member are respectively arranged at opposite sides of the base, the first barrier member is configured to block the first through hole and expose the second through hole, and the second barrier member is configured to block the second through hole and expose the first through hole.

* * * * *